United States Patent
Sloane et al.

(10) Patent No.: US 10,812,590 B2
(45) Date of Patent: Oct. 20, 2020

(54) SYSTEM FOR GENERATING DISTRIBUTED CLOUD DATA STORAGE ON DISPARATE DEVICES

(71) Applicant: Bank of America Corporation, Charlotte, NC (US)

(72) Inventors: Brandon Sloane, Santa Barbara, CA (US); Brian Diederich, Simi Valley, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 277 days.

(21) Appl. No.: 15/816,848

(22) Filed: Nov. 17, 2017

(65) Prior Publication Data

US 2019/0158593 A1    May 23, 2019

(51) Int. Cl.
*H04L 29/08* (2006.01)
*H04L 29/06* (2006.01)
*H04L 29/14* (2006.01)

(52) U.S. Cl.
CPC ...... *H04L 67/1097* (2013.01); *H04L 63/0428* (2013.01); *H04L 63/083* (2013.01); *H04L 69/40* (2013.01)

(58) Field of Classification Search
CPC .............. H04L 63/0428; H04L 63/083; H04L 67/1097
See application file for complete search history.

(56) References Cited

U.S. PATENT DOCUMENTS

| | | | |
|---|---|---|---|
| 7,020,665 B2 | 3/2006 | Douceur et al. | |
| 7,200,618 B2 | 4/2007 | Douceur et al. | |
| 7,299,250 B2 | 11/2007 | Douceur et al. | |
| 7,685,126 B2 | 3/2010 | Patel et al. | |
| 7,886,016 B1 | 2/2011 | Tormasov | |
| 7,962,779 B2 | 6/2011 | Patel et al. | |
| 8,434,080 B2 | 4/2013 | Yendluri | |
| 8,489,709 B2 | 7/2013 | Matsuzawa | |
| 8,671,080 B1* | 3/2014 | Upadhyay | G06F 11/004 707/674 |
| 8,706,869 B2 | 4/2014 | Campion et al. | |
| 8,798,262 B1 | 8/2014 | Raizen et al. | |
| 8,799,681 B1 | 8/2014 | Linnell et al. | |
| 8,997,198 B1 | 3/2015 | Kelley et al. | |
| 9,060,239 B1 | 6/2015 | Sinha et al. | |

(Continued)

*Primary Examiner* — Philip J Chea
*Assistant Examiner* — Mohammed Ahmed
(74) *Attorney, Agent, or Firm* — Michael A. Springs; Moore & Van Allen PLLC; Seongun M. Hong (57) ABSTRACT

A system is configured to allocate storage space on existing devices within the entity's networked system to create cloud storage space. In particular, unallocated space on computing devices, typically user devices, within an entity's network is utilized as a cloud data repository. Cloud data is indexed, divided into chunks, encrypted, and stored on numerous disparate endpoint devices connected to the network. Copies of cloud chunk data may be duplicated across multiple endpoint devices to allow for data redundancy, thereby ensuring cloud data uptime according to the availability needs of the entity. Cloud data may further be allocated to different devices based on regional data restrictions. In this way, the system provides an efficient and secure way to generate an internal cloud data storage repository within an entity's networked system.

18 Claims, 3 Drawing Sheets

(56) References Cited

U.S. PATENT DOCUMENTS

| | | |
|---|---|---|
| 9,207,866 B2 | 12/2015 | Boeuf et al. |
| 9,246,678 B2 | 1/2016 | Nayshtut et al. |
| 9,298,732 B2 | 3/2016 | Darcy |
| 9,373,001 B2 | 6/2016 | Cidon et al. |
| 9,413,730 B1 | 8/2016 | Narayan et al. |
| 9,716,696 B2 | 7/2017 | Narayan et al. |
| 2011/0238458 A1 | 9/2011 | Purcell et al. |
| 2011/0246433 A1 | 10/2011 | Sun |
| 2013/0110778 A1 | 5/2013 | Taylor et al. |
| 2013/0132948 A1 | 5/2013 | Hari et al. |
| 2014/0089510 A1 | 3/2014 | Hao et al. |
| 2014/0185457 A1* | 7/2014 | Barnes .................. H04W 8/005 370/242 |
| 2014/0297776 A1* | 10/2014 | Volvovski ............. G06F 16/182 709/212 |
| 2015/0295835 A1* | 10/2015 | Yang ....................... H04L 47/18 370/235 |
| 2017/0237529 A1* | 8/2017 | Eriksson ............... H04L 1/1825 714/748 |
| 2018/0020042 A1* | 1/2018 | Couleaud ................ H04L 67/32 |

\* cited by examiner

SYSTEM FOR GENERATING DISTRIBUTED CLOUD DATA STORAGE ON DISPARATE DEVICES

FIELD OF THE INVENTION

The present invention embraces a system, computer program product, and computer-implemented method for generating secured cloud data storage space in a distributed manner across a plurality of disparate devices within a networked system. In particular, the invention provides a way to optimally distribute cloud data across devices having different processing and/or networking capabilities and uptimes such that the cloud data is readily accessible and available.

BACKGROUND

As the ability of computing systems to gather, process, and retain data increases over time, there is an ongoing need for data storage space. Accordingly, there is a need for an efficient way to provide additional storage space available to an existing networked system.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The invention is a novel system that allocates storage space on existing devices within the entity's networked system to create cloud storage space. In particular, unallocated space on computing devices, typically user devices, within an entity's network is utilized as a cloud data repository. Cloud data is indexed, divided into chunks, encrypted, and stored on numerous disparate endpoint devices connected to the network. Copies of cloud chunk data may be duplicated across multiple endpoint devices to allow for data redundancy, thereby ensuring cloud data uptime according to the availability needs of the entity. Cloud data may further be allocated to different devices based on regional data restrictions. In this way, the system provides an efficient and secure way to generate an internal cloud data storage repository within an entity's networked system.

Accordingly, embodiments of the present invention provide a system, a computer program product, and a computer-implemented method for generating a distributed cloud data repository across a plurality of endpoint devices. The invention comprises receiving a request to store data on the cloud data repository; assigning a data identifier to the data within a data reference index; selecting a first endpoint device and a second endpoint device for storing the data, wherein the first endpoint device is assigned a first device ID within a device index, and the second endpoint device is assigned a second device ID within the device index; associating the data identifier with the first device ID and the second device ID; dividing the data into a plurality of data portions, the plurality of data portions comprising a first data portion and a second data portion; encrypting the plurality of data portions via a data packing system; transferring, over a network, the first data portion and the second data portion to the first endpoint device; and transferring, over the network, the first data portion and the second data portion to the second endpoint device.

In some embodiments, the invention further comprises receiving a request to retrieve the data from the cloud data repository; searching the data reference index to identify the data identifier associated with the data; determining that the first device ID and the second device ID are associated with the data identifier; determining, via the first device ID and the second device ID, that the data is stored on the first endpoint device and the second endpoint device; retrieving, over the network, the first data portion and the second data portion from the first endpoint device; decrypting the first data portion and the second data portion; regenerating the data, wherein the data comprises the first data portion and the second data portion; and transferring, over the network, the data to a computing system.

In some embodiments, the invention further comprises retrieving device attribute data associated with the first endpoint device and the second endpoint device from the device index; based on the device attribute data, determining a processing power and a bandwidth capability of the first endpoint device and the second endpoint device; and determining that the processing power and the bandwidth capability of the first endpoint device and the second endpoint device are sufficient to host the data, wherein the first endpoint device and second endpoint device are selected based on determining that the processing power and the bandwidth capability of the first endpoint device and the second endpoint device are sufficient to host the data.

In some embodiments, the invention further comprises attempting to establish a secure communication channel with the first endpoint device; detecting that the first endpoint device is offline; based on detecting that the first endpoint device is offline, determining that data uptime has dropped below a required uptime threshold; generating a copy of the first data portion and the second data portion; and transferring, over the network, the first data portion and the second data portion to a third endpoint device.

In some embodiments, the invention further comprises attempting to establish a secure communication channel with the first endpoint device; detecting that the first endpoint device is experiencing high latency; based on detecting that the first endpoint device is experiencing high latency, determining that data uptime has dropped below a required uptime threshold; generating a copy of the first data portion and the second data portion; and transferring, over the network, the first data portion and the second data portion to a third endpoint device.

In some embodiments, the data is subject to a data restriction. In such embodiments, the invention further comprises determining that the first endpoint device has violated the data restriction; and deleting, via an automatic wipe function, the first data portion and the second data portion from the first endpoint device.

In some embodiments, the invention comprises deploying a data management application on the first endpoint device, wherein the data management application, when executed by a processor of the first endpoint device, causes the processor of the first endpoint device to determine that the first endpoint device has violated the data restriction; and delete, via an automatic wipe function, the first data portion and the second data portion from the first endpoint device.

In some embodiments, the data restriction is a territorial restriction which restricts the location of the first endpoint device to a predetermined territory, wherein determining that the first endpoint device has violated the data restriction comprises continuously monitoring the location of the first endpoint device; and detecting that the first endpoint device is located outside of the predetermined territory.

In some embodiments, the invention comprises a machine learning component. In such embodiments, the invention further comprises retrieving historical data related to the data; and based on the historical data, adjusting a level of redundancy associated with the data. In some embodiments, the historical data comprises usage information. In some embodiments, adjusting the level of redundancy associated with the data comprises determining, from the usage information, that the data is frequently accessed; and based on determining that the data is frequently accessed, transferring, over the network, the first data portion and the second data portion to a third endpoint device.

In some embodiments, the first endpoint device is in operative communication with the network via a wireless connection, wherein the second endpoint device is in operative communication with the network via a wired connection, and wherein each of the first endpoint device and second point device is a user computing device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates a system of networked computing devices and/or systems on which the cloud storage system described herein is implemented. The entity may be a business organization, a non-profit organization, a government organization, and the like.

"User" as used herein may refer to an individual who may log onto the system to view and/or manage the cloud storage system. In other embodiments, the user may be an individual who has ownership or possession of an endpoint device on the network which is used to host a portion of the distributed cloud data repository. Typically, the user is authorized by the entity to access the system. Accordingly, in some embodiments, the user may be an employee of the entity such as an administrator.

"Computing system" or "computing device" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, single board computer, smart device, or laptop, or the computing system may be a stationary unit such as a personal desktop computer or networked terminal within an entity's premises. In some embodiments, the computing system may be a local or remote server which is configured to send and/or receive inputs from other computing systems on the network.

"Endpoint device" as used herein may refer to a computing system within the entity's network which hosts a part of the distributed cloud data repository. Each endpoint device typically comprises a storage medium for which at least a portion of the storage space is unused. The unused storage space within each endpoint device is ultimately allocated to store the distributed cloud data. Typically, the endpoint device is a user device which is connected to the entity's network. Accordingly, endpoint devices are typically desktop computers, laptops, smart phones, tablet computers, and the like. In other embodiments, the endpoint device may be a server with unused storage space. While the endpoint devices are typically devices possessed and/or operated by users within the entity (e.g. employees of the entity), the endpoint device may in some embodiments be user devices or servers located outside of the entity which are able to connect to the entity's network (e.g. through a WAN/Internet).

"Cloud," "cloud storage," "cloud data storage," or "cloud data repository" as used herein may refer to a distributed data repository that is shared and accessible to multiple users and systems within a network. The cloud storage may exist as a single logical space which is distributed amongst the various endpoint devices which comprise the cloud storage as a whole.

"Data," "data file," or "cloud data" as used herein may refer to the set of data or particular data file that is to be stored on the cloud data repository. In some embodiments, a user may upload the data to the cloud directly. In other embodiments, certain types of data will automatically be loaded onto the cloud data repository. It should be understood that while portions of the specification may refer to a "data file," such portions may also be understood to refer to "data" or "sets of data."

"Data portion" as used herein may refer to a subset of a set of data or data file. The system may divide data into data portions for storage on various endpoint devices. The endpoint devices may then be multiplexed to produce a data stream of the data files to various user devices within the entity's network. Typically, the data portion is a nibble.

Embodiments of the present invention provide a system, computer program product, and method for generating secured cloud data storage space in a distributed manner across a plurality of disparate devices within a networked system. In particular, the system allocates unused data storage space on a number of endpoint devices on the network to create a cloud data repository. In this way, this cloud data repository allows an entity to address its increasing data storage needs in an efficient way without the need to add additional hardware devices (e.g. computing devices, storage devices, routing devices, and the like).

The system may comprise a centralized data management system which indexes data and/or metadata which correlates the files to be stored on the distributed cloud data storage with the particular endpoints on which the files are to be stored. For instance, the file reference ID may be correlated to one or more endpoint device ID's. The data management system may further track the attributes of the endpoint devices, such as the type of hardware (e.g. the networking cards, the type of storage device used, the processing capabilities), the owner of the device, the degree of latency between the endpoint device and various computing systems within the entity's network, the percentage of time that the device is available on the network, and the like. Such data and/or metadata may be compiled in an index generated by the centralized data management system. In this way, the data management system is able to calculate the endpoint device's ability to serve the stored data in an expedient and reliable manner. The data management system may further be configured to flag the indexed files according to the importance or requirements of the files to be stored on the cloud data storage. Using this information, the data management system may decide on exactly which endpoint devices certain data should be stored and/or the level of redundancy required for particular data.

For example, for more frequently utilized data, it is preferable to store such data on a device with low latency. Accordingly, the data management system may determine that such data flagged as having a "low latency" requirement should be stored on a computing device connected to the network via a wired connection with storage space allocated on a solid state drive. As such, the system may establish a latency threshold for a particular set of data or a data file. The system may then periodically monitor the status of the endpoint devices on which the data is stored to ensure that the latency across the devices does not fall below the latency threshold. In some embodiments, the latency across the devices may be calculated as an average. If the average latency across the devices falls above the latency threshold, the system may determine that the data should be transferred to a different and/or additional endpoint device which has the processing power and/or networking bandwidth to allow for low latency retrieval of the data. In addition, the data management system may also address the low latency requirement by increasing the level of redundancy of the data. In such embodiments, the system may replicate the data and store the data on multiple devices. In this way, when the data is recalled from multiple devices, the available bandwidth for retrieving the data is increased, thereby leading to lower latencies. In some embodiments, the indexed files may be flagged to prioritize file integrity. In such embodiments, the system will automatically generate more copies of said data to ensure the accuracy of the flagged data.

In some embodiments, if the data does not have a low latency requirement (e.g. the data is archived, infrequently accessed data), the data management system may determine that such data may be stored on a mobile device connected to the network via a wireless connection. Furthermore, depending on the uptime of each of the computing devices on the network and the probability of the device being unavailable during a particular time period, the data management system may determine that a number of copies of the data must be stored across a number of different devices to ensure that the data will be available on a consistent basis. For example, the system may further establish a required uptime threshold based on the attributes of the data file. The required uptime threshold may be based on an average percentage of time that the data is available for retrieval (e.g. average 90% uptime), and/or on uptime during a specific time period (e.g. 100% uptime between 9 AM and 5 PM). The system may periodically query the endpoint devices to ensure that the data is available for retrieval and constantly monitor the uptime of the endpoint devices in relation to the required uptime threshold. In some embodiments, the uptime of the endpoint devices may fall below the required uptime threshold if one or more endpoint devices are determined by the system to be unavailable. For example, the system may determine that an endpoint device is unavailable based on the endpoint device being unreachable over the network (e.g. the endpoint device is disconnected from the network, shut down, inoperable, etc.). In other embodiments, the system may determine that an endpoint device is unavailable based on the endpoint device experiencing a high degree of latency (e.g. the endpoint device is online/reachable, but has insufficient computing resources to reliably transfer the data file).

The data management system may further comprise a machine learning component which stores historical data on the data stored in the cloud data repository, as well as the devices on which the data was stored at various points in time. The data management system may further collect historical data on data uptime, user load, transfer speeds, and the like. Using this historical data, the data management system may dynamically adjust the level of redundancy of the data to maximize efficiency. For instance, if the data uptime falls below a certain threshold at a given level of redundancy, the data management system may increase the number of copies created for a given set of data. Likewise, if user load (i.e. the frequency with which the data is accessed and/or retrieved from the cloud data repository) associated with a certain set of data falls below a threshold, the data management system may automatically delete a copy of the data on one or more endpoint devices as needed to save computing resources. In some embodiments, the data stored on the cloud data repository may be subject to a minimum level of redundancy to ensure availability of the data even in the event of a data loss incident (e.g. the hard drive becomes corrupt, the user loses the endpoint device, etc.).

In some embodiments, the data management system may impose restrictions on the types of data that can be stored on specific endpoint devices. For instance, the data management system may place a geographic restriction on certain types of data, which will in turn limit the types of endpoint devices on which such data may be stored. For example, there may be a regulatory or legal requirement that requires certain data to be kept within a certain territory or country. Accordingly, the data management system may exclude certain endpoint devices, such as mobile devices, if said devices are known to be carried outside of the territory or country. In other embodiments, the data management system may place restrictions such that certain data may be stored only on devices that are within the physical control of the entity at all times, such as a stationary server or workstation within the entity's premises. Such a restriction would exclude devices such as laptops, smartphones, tablet computers, and the like from being used to store data restricted in such a manner.

The system may further comprise a data packing system, which encrypts, stores, retrieves, and decrypts the data on the various endpoint devices. In particular, the data packing system may divide the data to be stored on the cloud into individual chunks, or data portions. The data portions may then be encrypted and transmitted to the endpoint devices over the network for storage. By encrypting the data before it is stored on the endpoint device, the data packing system ensures that the encrypted data is inaccessible to all parties except for those specifically authorized by the entity system to access the data. Typically, the encrypted data will further be inaccessible to the user having physical possession of the endpoint device, as the user of the endpoint device may not necessarily be authorized by the entity to access the encrypted data. In some embodiments, multiple copies of each data portion may be generated by the data packing system and subsequently sent to multiple different endpoint devices to achieve the desired level of redundancy to ensure consistent uptime of the data stored on each endpoint device.

In some embodiments, the data packing system may be configured to automatically delete (e.g. remote wipe) the data portions stored on a particular endpoint device upon detecting that the endpoint device has been compromised. For instance, the system may detect that the endpoint device has traveled outside of the authorized geographic area, or that the endpoint device has been stolen or cracked. In some embodiments, the remote wipe function may be accomplished via a data management application stored on the endpoint device which communicates with the system and/or automatically wipes the data portions stored on the device upon detecting that the device has been compromised. In other embodiments, the data portions themselves may contain executable code to execute the remote wipe function. In yet other embodiments, the data management application may, upon detecting that the endpoint device has been offline or otherwise unavailable for a predetermined period of time, automatically wipe the data portions stored on the device, thereby ensuring the security of the data stored on devices taken outside of the reach of the entity's network.

Creating a distributed cloud data storage system in this way addresses a number of technology-centric challenges compared to current technology, specifically with respect to utilizing endpoint devices for storage. In particular, endpoint devices typically vary dramatically in their processing capabilities, network latencies, mobility, uptimes and/or availability, and the like. The invention disclosed herein allows an entity to dynamically adjust the manner in which data is stored on endpoint devices to allow the system to account for differences in endpoint device uptime and network latency. This greatly improves both the reliability and performance of the distributed cloud data storage system. Furthermore, the machine learning component of the system allows the entity to find the optimal configuration for maintaining the cloud data storage system, which in turn helps prevent the waste of computing resources associated with generating and/or maintaining extraneous copies of cloud data. The computing resources saved by the system may include processing power, memory space, storage space, cache space, electric power, networking bandwidth, and the like.

Figure 1:
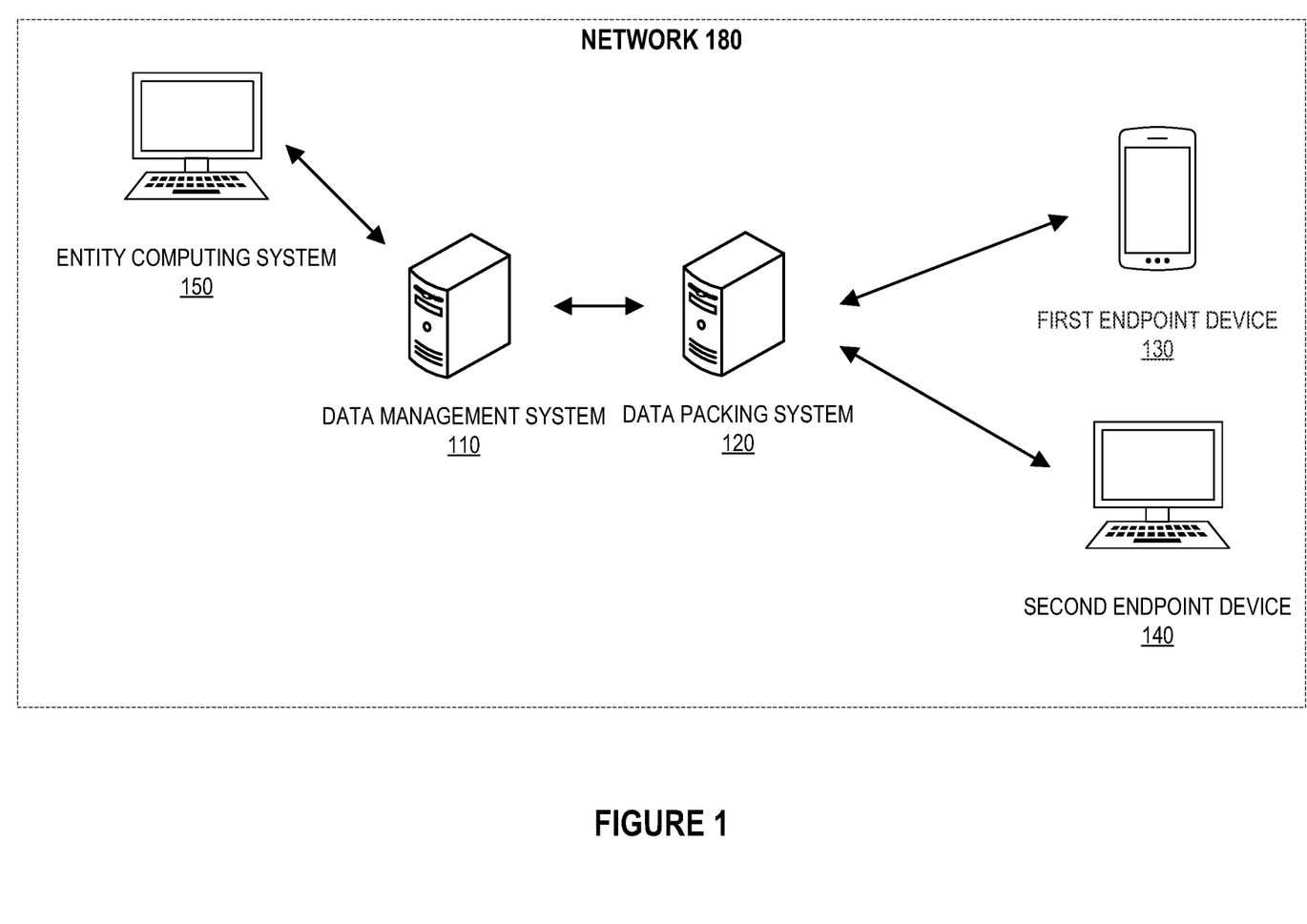
FIG. 1 is a block diagram illustrating an operating environment for the information security threat assessment system, in accordance with one embodiment of the present invention.

FIG. 1 is a block diagram illustrating an operating environment for the information security threat assessment system, in accordance with one embodiment of the present invention. The operating environment may include a data management system 110 in operative communication with a data packing system 120, an entity computing system 150, and a plurality of endpoint devices 130, 140 over a network 180. The network 180 may also be a global area network (GAN), such as the Internet, a wide area network (WAN), a local area network (LAN), or any other type of network or combination of networks. The network 180 may provide for wireline, wireless, or a combination wireline and wireless communication between devices on the network 180. It should be understood by those having ordinary skill in the art that although the data management system 110, the data packing system 120, the entity computing system 150, the first endpoint device 130, and the second endpoint device 140 are depicted as single units, each of the depicted computing systems may represent multiple computing systems. In some embodiments, a given computing system as depicted in FIG. 1 may represent multiple systems configured to operate in a distributed fashion. For instance, the data management system 110 may represent a plurality of computing systems which exists within the entity's networks. In other embodiments, the functions of multiple computing systems may be accomplished by a single system. For instance, the functions of the data management system 110 and the data packing system 120 may, in some embodiments, be executed on a single computing system according to the entity's need to efficiently distribute computing workloads.

Typically, the data management system 110 is a computing system within the entity's premises, such as a server, networked terminal, workstation, and the like. The data management system 110 may be configured to receive a signal from an entity computing system 150 that a user wishes to store data (e.g. one or more data files) on a cloud data repository. To this end, the data management system 110 stores the executable code needed to determine the particular endpoint devices on which to store the data. The data management system 110 may further comprise a cloud data index which contains information about the endpoint devices as well as the cloud data stored on the endpoint devices. Typically, each data file or other set of data stored on the cloud data repository will be assigned an identifier (e.g. a unique file reference ID) within the index, and each endpoint device will be assigned a device identifier (ID) within the index. Each data identifier may be associated with one or more device ID's, depending on the suitable level of redundancy for the file. In some embodiments, this may depend on the nature of the data, such as the level of confidentiality, the degree of importance to the entity's operations, restrictions on the usage of the data, and the like. Typically, these file attributes will be stored along with the data identifier to be used by the data management system 110 to calculate the level of redundancy for each file and/or the specific endpoint devices to be used to store the data.

The index may further store additional information along with each device ID, where the additional information may be a set of attributes of the endpoint device associated with the device ID. The attributes may include the identity of the owner of the endpoint device, the level of latency of communications between the endpoint device and a central entity server, the amount of networking bandwidth and/or computing power available to the endpoint device, the type of device (e.g. workstation, laptop, smartphone, tablet, etc.), the geographic location, device uptime (e.g. the percentage of time the endpoint device is accessible on the entity's network), and the like. Based on the attributes of the data to be stored on the cloud and the attributes of the various endpoint devices on the network, the system may determine that a set of endpoint devices, in the aggregate, have enough processing power and/or bandwidth capability to host the data. The system may subsequently match the data, along with the associated data identifiers, to the set of endpoint devices, along with their associated device ID's.

For example, certain data uploaded to the system may be subject to an uptime requirement, such as when the entity requires a file or set of files to be accessible at all times. The system may then determine that a number of endpoint devices are available to store the data. The system may take into account the average uptime (e.g. a percentage) of the available endpoint devices as well as the periods of time in which the device is online, then replicate the data as many times as desired and send copies of the data to as many endpoint devices as desired to ensure that the data is consistently available 24 hours a day. Once the system has determined which endpoint devices will store the data, the data management system 110 may be configured to send the data file to the data packing system 120 to encrypt and transmit the data in data portions to the endpoint devices. In some embodiments, the system may set a required uptime threshold which takes into account the uptime percentages and online periods of the aggregated endpoint devices. In the event that the average uptime of the endpoint devices falls below a certain threshold (e.g. one or more endpoint devices are offline, inoperable, suffering connectivity issues, and the like), the system may create an additional copy of the data to be sent to an alternative and/or additional endpoint device, thus ensuring data availability even during varying conditions.

In some embodiments, the data to be uploaded to the system may be subject to a latency requirement, such as when the entity requires the data to be capable of being retrieved in a timely manner. The system may, in some embodiments, set a required latency threshold, which may be measured as the time it takes to transfer a data file of a predetermined size. In such embodiments, the system may assess the computing capabilities of the various endpoint devices in the system, such as by conducting a data transfer test. In this way, the system is able to determine the capabilities of each endpoint device to transfer data efficiently. By taking into account the processing capabilities of the endpoint devices, the system is able to create the number of replications of the data desired to ensure expedient retrieval of the data. In some embodiments, the system may determine that the data may be stored on computing systems which have high processing power and bandwidth. In other embodiments, the system may determine that the data may be stored on a greater number of weaker computing systems such that in the aggregate, the weaker computing systems may still provide the bandwidth to satisfy the required latency threshold.

The data management system 110 may further comprise a machine learning component which tracks historical data on the file reference ID's and device ID's used to store data in the past. The historical data will further include the attributes of the file to be stored, the attributes of the endpoint devices, and the level of redundancy for each file stored on the cloud data repository. The machine learning component may track usage data for the files stored on the cloud and correlate the usage with file uptime and latency in retrieving the file. Based on this historical data, the machine learning component may dynamically adjust the level of redundancy and/or the types of endpoint devices used to store similar data files in the future. For example, if a particular type of file (e.g. an executable file to deploy software) consistently sees a high utilization rate compared to the availability of the data file, the machine learning component may increase the level of redundancy and/or store the file on endpoint devices with faster processing speeds and/or network connections to increase file storage/retrieval performance. On the other hand, if a particular type of file sees low utilization compared to existing redundancy and latency, the system may reduce the level of redundancy and/or store the data files on devices with lower uptimes, in order to save computing resources.

In some embodiments, the cloud data index may be stored in blockchain form. In such embodiments, the data identifiers, device ID's, file attributes, and device attributes are stored in a distributed fashion amongst a plurality of data management systems 110. In some embodiments, the plurality of data management systems 110 each comprise a complete copy of the blockchain, thus protecting the index from data degradation while simultaneously increasing its security by preventing the introduction of false index data. Each block on the blockchain may comprise information related to one file reference ID; that is, the block may contain data on the devices on which a data file is stored, the attributes of the file to be stored, and the attributes of the devices on which the file is stored. Each block may further comprise a time stamp and contain a reference to the previous block in the chain. In some embodiments, the reference may be in the header of the block. Each block may be added to the blockchain via a consensus mechanism amongst the plurality of data management systems 110. In this way, the data records in the index are comprised of only authorized blocks. A generalized description of the blockchain may be found in U.S. patent application Ser. No. 15/291,799, the contents of which are hereby incorporated by reference in its entirety.

Like the data management system 110, the data packing system 120 is typically a computing system within the entity's premises. The data packing system 120 may be configured to read the index within the data management system 110 and accept data files (identified by file reference ID) from the entity computing system 150 and store the data files in an encrypted form on the endpoint devices (identified by device ID). Typically, the data packing system 120 first divides the data files provided by the entity computing system 150 into data portions. This is done not only for the purposes of efficiency (i.e. smaller files are easier to transmit and receive), but this also ensures that the users of the endpoint devices are unable to access the content stored within the endpoint device. Typically, the data packing system 120 creates duplicates of the data portions to be stored on different endpoint devices according to the level of redundancy associated with each data identifier. Once the data portions have been encrypted and/or duplicated, the data packing system 120 may establish a secure communications channel with each endpoint device and transfer the data portions to the endpoint devices for storage. In some embodiments, the data packing system 120 may further be configured to decrypt the data portions stored on the endpoint devices, such as when the data packing system 120 receives a request from the entity computing system 150 or other computing system to retrieve the data files associated with one or more data identifiers. Upon receiving such a request, the data packing system 120 may retrieve the encrypted data portions from each endpoint device corresponding to the data identifiers requested, decrypt the data portions, recombine the data portions to form the completed data files, then send the completed data files to the entity computing system 150 over a secure communications channel.

The entity computing system 150 is typically a device that may be operated by a user, where the device may be a mobile device such as a smartphone, tablet, or laptop, a personal computing device such as a desktop computer, smart device, single board computer, or a stationary device such as a computer system terminal, workstation, personal computer, and the like. In some embodiments, the user is an employee of the entity who may wish to store and recall data on the cloud data repository in the enterprise context. In other embodiments, the user may be a client of the entity who wishes to store and recall personal data on the cloud data repository. In an exemplary embodiment, the user may wish to store a user data file (e.g. a document) on the cloud data repository. The user may securely log onto the system by providing authentication credentials associated with the user. The authentication credentials may include a username and password, secure token, cryptographic key, and the like.

Once authenticated, the user may upload the user data file to the data management system 110. The data management system 110 may index the user data file and assign a file reference ID to the data file. The user may further be able to specify certain attributes of the user data file, such as territorial restrictions, level of confidentiality, purpose of use (e.g. long-term backup vs. high performance applications in which rapid retrieval is desirable), and the like. Based on the attributes of the user data file, the data management system 110 may assign the file reference ID to one or more endpoint devices, which are identified by device ID. In an exemplary embodiment, the data management system may assign the user data file to the first endpoint device 130 and the second endpoint device 140. Once the endpoint devices have been identified, the data management system 110 may send the user data file to the data packing system 120 for encryption, chunking, and storage on the specified endpoint devices. Continuing the example, the data packing system 120 may divide the user data file into data portions and store the data portions on the first endpoint device 130 and/or the second endpoint device 140. In some embodiments, each data portion may be replicated and stored on both the first endpoint device 130 and the second endpoint device 140. In some embodiments, data file attributes and/or device attributes may be stored as metadata with each data portion.

Like the entity computing system 150, the first endpoint device 130 and the second endpoint device 140 are typically computing systems that may be operated by a user. In some embodiments, the user may be an employee of the entity, where the endpoint devices are enterprise devices. In other embodiments, the user may be a client of the entity, where the endpoint devices are personal devices. In yet other embodiments, the user may be a third party individual existing outside of the entity's systems who wishes to contract with the entity to allow the entity to store cloud data on the individual's device. Typically, all data uploaded to the cloud is encrypted from end to end. Thus, the security of the cloud data can be ensured even if the endpoint device is not formally a part of the entity's systems (e.g. the user is not an employee of the entity). In other embodiments, the first endpoint device 130 and/or the second endpoint device 140 may be a server having unused storage space, which may not typically be configured to interface with a user. In some embodiments, the server may exist within the entity's network and/or premises. In other embodiments, the server may be a third party server with unused storage space which remotely connects to the entity's network, e.g. over the Internet.

Both the first endpoint device 130 and the second endpoint device 140 each comprise a storage device for which at least a portion of the storage is unused. The unused portion of the storage for each endpoint device may be allocated by the system to be used to store the cloud data. The system may also dynamically adjust the amount of space allocated on the endpoint device. In an exemplary embodiment, when the storage device has a relatively high amount of free storage space (e.g. 80%), the system may allocate a comparatively larger amount of space to be used to store cloud data (e.g. 20% of the free space). However, as the free storage space on the endpoint device decreases below a certain threshold (e.g. 20%), the system may reduce the allocation of cloud data storage space (e.g. 5% of the free space) in order to ensure that the lack of free space does not hinder the performance of the endpoint device.

Typically, the allocated cloud data storage space is not accessible to the user of the endpoint device. In some embodiments, the cloud data storage space may be allocated using a cloud application stored on each endpoint device. In other embodiments, the data portions may contain self-executing code which automatically allocates the space needed to store the data portion. In some embodiments, the endpoint devices may be configured to communicate with each other and/or transfer encrypted data portions to and from one another. For instance, if the system decides that the level of redundancy for a certain data file should be increased, the first endpoint device 130 may generate a copy of the encrypted data portions stored therein and send the data portions to the second endpoint device 140. In this way, excessive computing load on the data packing system 120 may be avoided.

The system may take the endpoint device's attributes into account when deciding which data files should be stored on a specific endpoint device. In an exemplary embodiment, the first endpoint device 130 may be a mobile device such as a smartphone which connects to the network primarily through wireless technologies, such as cellular networks or WiFi. Accordingly, the first endpoint device 130 may experience periods of time in which the first endpoint device 130 is unable to connect to the entity's network (i.e. reducing uptime). Furthermore, the mobile nature of the first endpoint device 130 may indicate that the first endpoint device 130 has a comparatively lower processing capability or networking bandwidth. Accordingly, the system may determine that the cloud data stored on the first endpoint device 130 must be replicated and stored on other endpoint devices for backup purposes. Furthermore, the system may determine that only long-term backup data should be stored on the first endpoint device 130, rather than frequently used data that may need to be recalled at a high level of speed. On the other hand, the second endpoint device 130 may be a dedicated stationary server within the entity's premises connected via a wired high speed connection (e.g. Ethernet). In such an embodiment, the system may determine that the second endpoint device 130 is suitable to store cloud data that is frequently accessed by other users within the entity's systems.

In some embodiments, the endpoint devices may comprise an automatic wipe function which deletes the cloud data on the endpoint device within the allocated storage space. In some embodiments, the automatic wipe function is executed by the system or by an application stored on the endpoint device. In other embodiments, the automatic wipe function is embedded into logic code portions of the data portions stored on the endpoint devices. The automatic wipe function may be triggered, for instance, upon the system detecting that the endpoint device has been compromised (e.g. stolen, cracked, or breached). Such functionality may be critical in situations in which the cloud data comprises sensitive data, such as confidential information. The automatic wipe function may further be used upon detecting that the cloud data stored on a particular endpoint device is subject to a territorial restriction and the endpoint device is located outside of the territorial area covered by the restriction. The system may detect the endpoint device's location via various methods, such as GPS, IP address, cellular tower triangulation, and the like. Upon detecting that the territorial restriction has been violated by the endpoint device, the automatic wipe function may be triggered. In some embodiments, the automatic wipe function may be selective in which data portions are automatically deleted. For example, in some embodiments, an endpoint device may be used to store data that is subject to territorial restrictions as well as data that is not subject to any such restrictions. In such scenarios, the automatic wipe function may be configured to selectively delete only the data that is subject to the territorial restriction upon detecting that the condition that triggers the automatic wipe function. In yet other embodiments, the automatic wipe function may be executed by the endpoint device after a predefined period of no communication with the system. For instance, an endpoint device may have been determined to have been offline for a predefined period of 30 days. In such a case, the application within the endpoint device may be configured to automatically wipe the cloud data within the endpoint device. By executing the automatic wipe in this way, the security of the cloud data on the endpoint device may be preserved even in periods in which the system is unable to reach or control the endpoint device.

Figure 2:
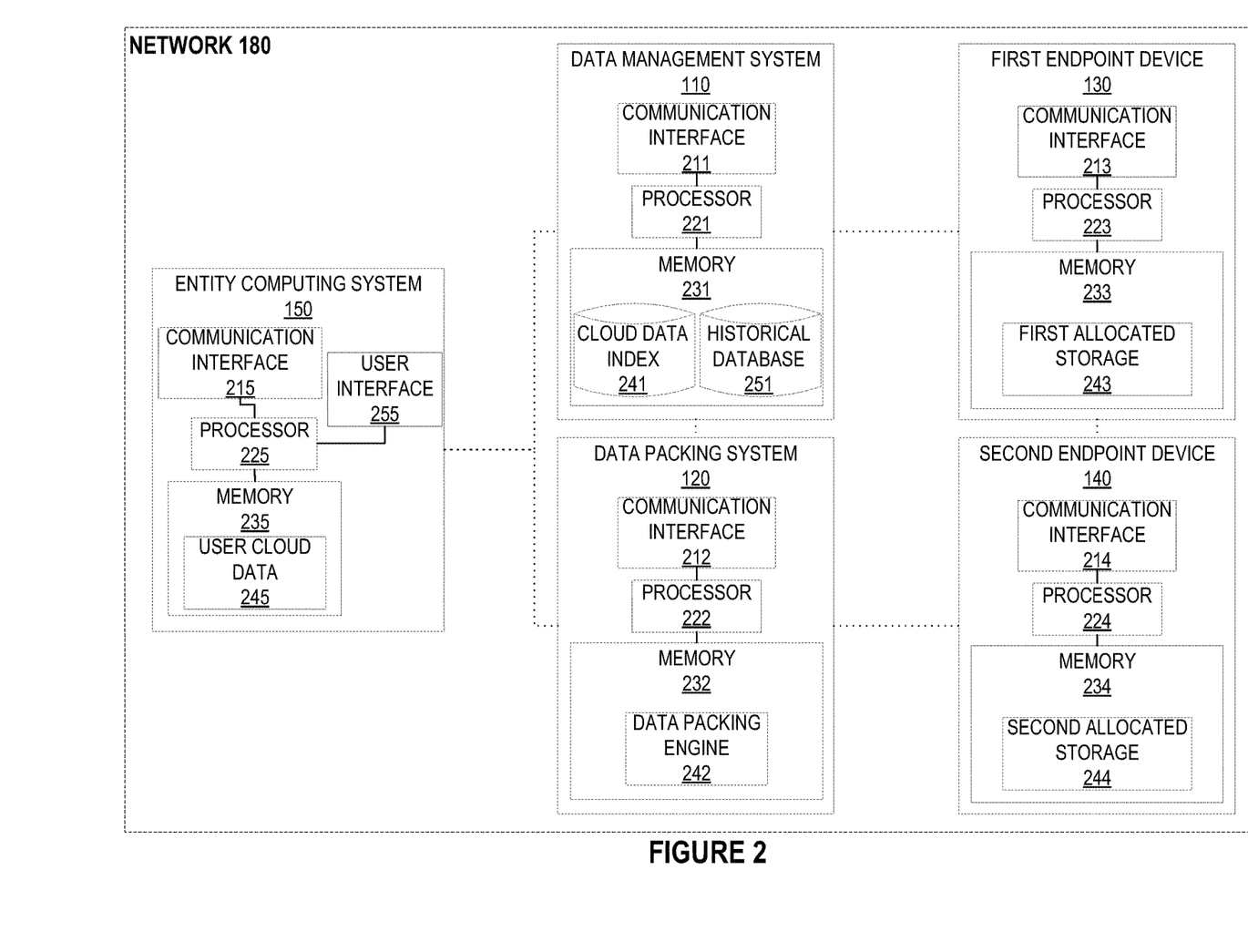
FIG. 2 is a block diagram illustrating the data management system, the data packing system, the first endpoint device, the second endpoint device, and the entity computing system in more detail, in accordance with one embodiment of the present invention.

FIG. 2 is a block diagram illustrating the data management system 110, the data packing system 120, the first endpoint device 130, the second endpoint device 140, and the entity computing system 150 in more detail, in accordance with one embodiment of the present invention. The data management system 110 typically contains a processor 221 communicably coupled to such devices as a communication interface 211 and a memory 231. The processor 221, and other processors described herein, typically includes circuitry for implementing communication and/or logic functions of the data management system 110. For example, the processor 221 may include a digital signal processor device, a microprocessor device, and various analog to digital converters, digital to analog converters, and/or other support circuits. The data management system 110 may use the communication interface 211 to communicate with other devices over the network 180. The communication interface 211 as used herein may include an Ethernet interface, an antenna coupled to a transceiver configured to operate on a cellular data, GPS, or WiFi signal, and/or a near field communication ("NFC") interface.

The data management system 110 may include a memory 231 operatively coupled to the processor 221. As used herein, memory includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like.

The memory 231 within the data management system 110 may comprise the cloud data index 241, which may comprise the data identifiers and device ID's, as well as the file attributes and device attributes. Typically, the cloud data index 241 contains data on files that are currently being stored on the cloud data repository. In some embodiments, a data identifier index is maintained separately from the device ID index. In other embodiments, both indices are combined into a single index. The data management system 110 may determine the endpoint devices on which to store user cloud data based on the data within the cloud data index 241, such as the type/characteristics of the user cloud data and the type/characteristics of the endpoint devices on which the user cloud data is to be stored. The memory 231 may further comprise a historical database 251, which contains data on files that were once stored on the cloud data repository, as well as other information such as file usage data, level of redundancy for each file, historical device uptime and performance (e.g. computing performance and/or network bandwidth), and the like. From the data within the historical database 251, the data management system 110 may use machine learning to improve the system's ability to determine the optimal level of redundancy for each data file and/or to select the optimal endpoint devices to store each data file.

The data packing system 120 may comprise a communication interface 212, a processor 222, and a memory 232 comprising a data packing engine 242 stored thereon. The data packing engine 242 may be responsible for importing the data file (e.g. the user cloud data) specified according to the data identifier referenced in the cloud data index 241 to be stored on one or more endpoint devices as specified by the device ID's. In some embodiments, the data packing engine 242 may be configured to divide the user cloud data into data portions for efficient storage on various endpoint devices. The data packing engine 242 may further be configured to encrypt each data portion such that the data portion may not be accessed by the endpoint devices. The data packing engine 242 may further transfer the encrypted data portions to the endpoint devices for storage. In some embodiments, the data packing engine 242 may further be configured to decrypt the encrypted data portions stored on various endpoint devices and combine them to form the original data file, which can then be subsequently accessed by other users within the entity's networks.

The first endpoint device 130 may comprise a communication interface 213, a processor 223, and a memory 233. The memory 233 may comprise a first allocated storage 243, which represents the storage space allocated by the system to serve as the cloud data repository. The first allocated storage 243 may be utilized by the system to store encrypted data portions received from the data packing system 120. The first endpoint device 130 is typically owned and/or operated by a first endpoint user. While the first endpoint user may retain physical possession of the first endpoint device 130 itself, the first endpoint user typically does not have access to the data within the first allocated storage 243.

Similar to the first endpoint device 130, the second endpoint device 140 is typically owned and/or operated by a second endpoint user and may comprise a communication interface 214, a processor 224, and a memory 234. The memory 234 may comprise a second allocated storage 244, which also represents the storage space allocated by the system to serve as the cloud data repository. Accordingly, the second allocated storage 244 may also comprise encrypted data portions received from the data packing system 120. In some embodiments, the memory 233 of the first endpoint device 130 and the memory 234 of the second endpoint device may each comprise an automatic wipe function, which is configured to automatically delete the data within the first allocated storage 243 or the second allocated storage 244 upon detecting a wipe condition, such as a security or data breach, or the triggering of a territorial restriction.

The entity computing system 150 is typically owned and/or operated by a user and includes a processor 225 operatively coupled to a communication interface 215 and a memory 235. The processor 225 may display a user interface 255 to a user, which may comprise the hardware and software implements to accept input from and provide output to the user. Accordingly, the user interface 255 may comprise hardware such as a display, audio output devices, projectors, and the like, or input devices such as keyboards, mice, motion sensors, cameras, biometric sensors, and the like. The user interface 255 may further comprise software such as a graphical or command-line interface through which the user may provide inputs and/or receive outputs from the entity computing system 150. It should be understood that the display on which the user interface 255 is presented may include an integrated display (e.g. a tablet or smartphone screen) within the entity computing system 150, or an external display device (e.g. a computer monitor or television). Typically, the memory 235 contains user cloud data 245, which represents the data files that the user wishes to store on the cloud data repository. The user may select the user cloud data 245 to be uploaded to the data management system 110 and/or the data packing system 120 for storage on the cloud data repository. The user may further access the decrypted cloud data on the cloud data repository via the entity computing system 150.

In some embodiments, the user interface 255 may allow the user to specify certain attributes of the user cloud data 245. For instance, the user may mark the user cloud data 245 as "confidential" or impose territorial restrictions (e.g. the devices on which the data is hosted must remain in the United States). The user may further restrict the number or types of users who may access the user cloud data 245. The user may further specify availability requirements (e.g. the data must be available during certain time periods), which the system may use to determine the level of redundancy of the user cloud data 245 when storing the data on the various endpoint devices. In this way, the system may ensure both the availability as well as the integrity of the data stored within the cloud data repository.

Figure 3:
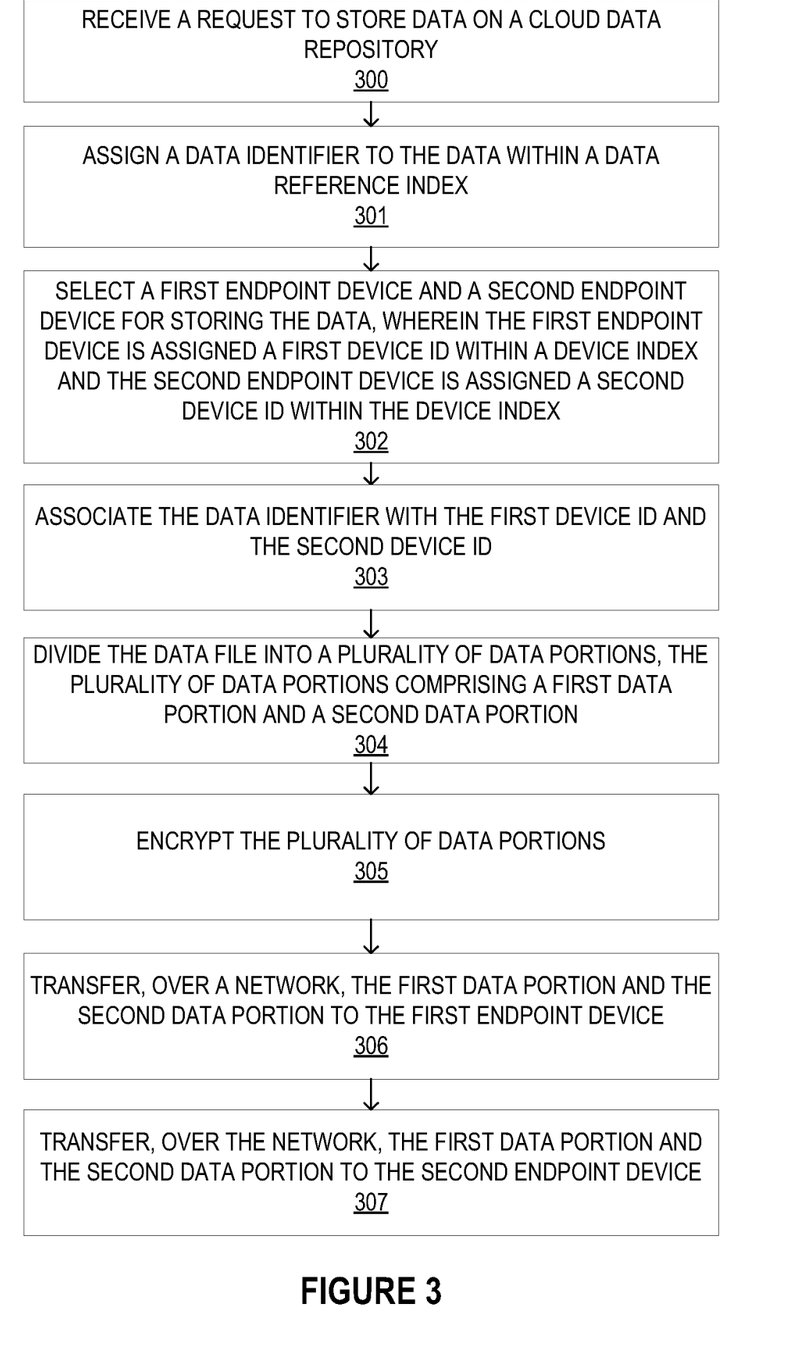
FIG. 3 is a process flow illustrating the transfer of a selected data to the cloud data repository, in accordance with one embodiment of the present invention.

FIG. 3 is a process flow illustrating the transfer of a selected data file to the cloud data repository, in accordance with one embodiment of the present invention. The process begins at block 300, where the system receives a request to store data on a cloud data repository. In some embodiments, the user logs onto the system through the entity computing system to upload the data file to the entity's systems. In some embodiments, the user may upload the data file to the system through an application installed on the entity computing system. In other embodiments, the data file may be uploaded via a website, FTP server, authenticated fileshare, and the like. In other embodiments, a different computing system within the entity's system may request that the data is stored on the cloud. In yet other embodiments, certain types of data (e.g. daily log files) may be stored on the cloud automatically.

In some embodiments, the data file may be related to the entity's operations and is intended to be accessed by other users within the entity's network. The user may further be able to set certain file attributes or preferences with respect to the storage and/or access of the file. For instance, the user may be able to mark the data file as restricted in various ways, such as access (e.g. only a certain class of users, such as administrators, may access the data file on the cloud) or territory (e.g. the device may be hosted only on a device that remains within a particular territory). In other embodiments, the rules may be predefined by the system. The file attributes may in some embodiments be stored within the data reference index hosted within the cloud data index on the data management system. In other embodiments, the file attributes may be appended to the data file as metadata.

The process continues to block 301, where the system assigns a data identifier to the data within a data reference index. Typically, the data reference index is part of the cloud data index hosted on the data management system. In some embodiments, the data management system may temporarily host the data file in order to extract the metadata and/or transfer the data file to the data packing system. In other embodiments, the data file may be hosted elsewhere while the data management system conducts its functions. The data identifier is typically unique to each data file uploaded to the system. In some embodiments, each data file receives a unique data identifier even if the data file is not currently hosted on the cloud data repository. In this way, even historically uploaded data files may be referenced using a unique data identifier, which may aid the machine learning process.

The process continues to block 302, where the system selects a first endpoint device and a second endpoint device for storing the data, wherein the first endpoint device is assigned a first device ID within a device index and the second endpoint device is assigned a second device ID within the device index. Typically, the device index is a part of the cloud data index within the data management system. Each endpoint device is assigned a unique device ID to identify which data files may be stored therein. The data management system may decide which endpoint devices should be used to store the data file at least partially on the file attributes and/or preferences provided by the user as well as the attributes of the endpoint devices. For instance, the system may exclude mobile devices based on the data file being flagged as confidential, such that only stationary endpoint devices located on the entity's premises may be selected to store the data file. The data management system may further account for the level of redundancy and/or device uptime needed to ensure data availability and integrity, which may in turn depend on the type of file being stored. For instance, data files serving as infrequently accessed long-term backups may require comparatively lower device uptime and/or redundancy compared to data files that are accessed frequently during the entity's operations. The data management system may also utilize machine learning to determine the optimal configuration of redundancy and/or endpoint device selection for each data file uploaded to the cloud data repository.

In an exemplary embodiment, the system may examine the device attributes for both the first endpoint device and the second endpoint device. The device attributes examined may include processing power, networking bandwidth capability, storage device speed, and the like. The system may then determine that the first endpoint device and the second endpoint device, at least in the aggregate, have sufficient attributes to host the data. The sufficiency of the device attributes to host the data may depend at least in part on the file attributes. For instance, if the data is frequently used data that may need to be accessed regularly and expediently, the system may impose greater device attribute requirements on the endpoint devices on which the data may be stored. Accordingly, the system may further track usage information of the data, such as how often the data is accessed or predicted to be accessed. In some embodiments, the system may examine device attributes, data attributes, and usage information to make the initial selection of endpoint devices to host the data. In an exemplary embodiment, the data to be uploaded may be subject to a territorial requirement and a 100% uptime requirement between the hours of 9 AM and 5 PM and is expected to be distributed to 100 users. In such embodiments, the system may take into account the data attributes (e.g. the various requirements and predicted usage information), and match the data to devices with device attributes that match the data attributes (e.g. devices that are online between 9 AM and 5 PM and are currently located within the territory).

In some embodiments, the system may further examine device attributes, data attributes, and usage information to make changes to the endpoint devices that currently host the data. For instance, the system may determine that the data is being accessed at a higher rate than expected. Accordingly, the system may dynamically generate copies of the data and transfer the data to one or more additional endpoint devices to increase the uptime and availability of the data. On the other hand, the system may also determine that the data is being accessed at a lower rate than expected. In such embodiments, the system may dynamically wipe the data on one or more endpoint devices in order to restore cloud storage space.

The process continues to block 303, where the system associates the data identifier with the first device ID and the second device ID. The system may create an association between the data identifier and a plurality of device ID's and subsequently store the association as data. In some embodiments, the data may exist within the cloud data index. In other embodiments, this association may exist as metadata within the data portions stored on the endpoint devices. In some embodiments, the data reference index may contain pointers to device ID's within the device index.

The process continues to block 304, where the system divides the data into a plurality of data portions, the plurality of data portions comprising a first data portion and a second data portion. Typically, the number of data portions generated by the system depends on the size of the data file to be uploaded to the cloud. In some embodiments, an endpoint device may be used to store at least a copy of all of the plurality of data portions that make up the data file. In other embodiments, each of the data portions may be sequentially stored across multiple endpoint devices. For instance, the first data portion may be stored on the first endpoint device, the second data portion may be stored on the second endpoint device, a third data portions may be stored on a third endpoint device, a fourth data portions may be stored on the first endpoint device, and so on. In this way, the data may then be multiplexed by the multiple endpoint devices when retrieving the data at a later date, which in turn increases the speed of the data stream. By allowing the system to distribute the data across a number of devices, the system may select the appropriate devices on which to store the data according to its performance requirements. Furthermore, the same data portions may be stored on multiple devices. For instance, the first data portion may be stored on both the first endpoint device and the second endpoint device, and so on depending on the redundancy needs of the data file. Typically, each data portions is replicated at least once and stored on at least two endpoint devices. In other words, the system may impose a minimum level of redundancy for all data uploaded to the cloud data repository. In this way, the system is able to optimally store data files on the cloud across a number of endpoint devices with disparate capabilities and uptimes.

The process continues to block 305, where the system encrypts the plurality of data portions. This ensures not only that the data portions may not be viewed by external third parties who may intercept the communication to the endpoint devices, but also ensures that the endpoint devices themselves may not access the data within the allocated spaces within the endpoint devices.

The process continues to block 306, where the system transfers, over a network, the first data portion and the second data portion to the first endpoint device. Typically, the first data portion and the second data portion are stored within the allocated space within the memory of the first endpoint device. It should be noted that the first data portion is encrypted at this point such that the user of the first endpoint device may not access the first data portion or the second data portion.

The process concludes at block 307, where the system transfers, over the network, the first data portion and the second data portion to the second endpoint device. In an exemplary embodiment, the first endpoint device may be a mobile device that has a limited uptime compared to the second endpoint device, which may be a stationary computing device with a near constant uptime. Based on the disparity in uptime, the system may determine that the data file should be replicated on a plurality of devices in order to increase data redundancy, which in turn ensures data availability in case one or more of the endpoint devices are unavailable (e.g. when the endpoint device is offline, during system failures, etc.).

In some embodiments, the system may be configured to retrieve data from the cloud data repository. In some embodiments, the system may receive a request to retrieve the data. In other embodiments, certain data is automatically retrieved from the cloud. The system may, based on reading the data reference index, identify the data identifier associated with the data to be retrieved. Based on the data identifier, the system may determine device ID's associated with the endpoint devices on which the data is stored, which in turn allows the system to correctly identify the endpoint devices which store the data. The system may then retrieve the plurality of data portions from at least one endpoint device for decryption. The system may then regenerate the decrypted data. In some embodiments, the system may subsequently transfer the data to a user. In other embodiments, the system may transfer the data to another computing system within the entity's network.

In some embodiments, the system may be configured to create additional copies of the data and upload the data to alternative and/or additional endpoint devices based on changing conditions. For instance, the system may determine that a particular endpoint device hosting a copy of the data is unavailable. In some embodiments, the device may be unavailable due to being offline. In other embodiments, the device may be unavailable due to the endpoint device experiencing high network latency. In such embodiments, the system may detect that data uptime has dropped below a required data uptime threshold due to the unavailability of the device. The system may then generate a copy of the first data portion and the second data portion and transfer them to a third endpoint device.

In some embodiments, the data uploaded to the cloud may be subject to a data restriction. For instance, the data restriction may be a requirement that the endpoint device on which the data is stored should remain in a predetermined territory. The system may execute an automatic wipe function based on detecting that an endpoint device has violated the data restriction. In some embodiments, detecting that the endpoint device has violated the data restriction may include continuously monitoring the location of the endpoint device (e.g. by GPS), and detecting that the endpoint device is located outside of the predetermined territory. In some embodiments, the system may send an automatic wipe command to the endpoint device over the network. In other embodiments, the system may deploy a data management application on the endpoint device. In some embodiments, the data management application may delete the data from the endpoint device via the automatic wipe function independently of receiving a command from the entity's systems. In some embodiments, the data management application may itself determine that the endpoint device has violated the data restriction (e.g. by determining by GPS that the endpoint device is located outside of the predetermined territory). In other embodiments, the data management application may be configured to automatically wipe the data from the endpoint device upon detecting that the endpoint device has not connected to the entity's network for a predetermined period of time.

In some embodiments, the system may comprise a machine learning component which allows the system to dynamically adjust the level of redundancy associated with the data using historical data. For instance, the system may determine that the data has not been accessed for a predetermined period of time. Based on this data, the system may reduce the level of redundancy (e.g. by wiping the data from one or more endpoint devices) in order to more efficiently allocate cloud space.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating a distributed cloud data repository across a plurality of endpoint devices, comprising:
    an data management system comprising:
        a processor;
        a communication interface; and
        a memory having executable code stored therein, wherein the executable code, when executed by the processor, causes the processor to:
            receive a request to store data on the cloud data repository;
            assign a data identifier to the data within a data reference index;
            select a first endpoint device and a second endpoint device for storing the data, wherein the first endpoint device is assigned a first device ID within a device index, and the second endpoint device is assigned a second device ID within the device index;
            associate the data identifier with the first device ID and the second device ID;
            divide the data into a plurality of data portions, the plurality of data portions comprising a first data portion and a second data portion;
            encrypt the plurality of data portions via a data packing system;
            transfer, over a network, the first data portion and the second data portion to the first endpoint device;
            transfer, over the network, the first data portion and the second data portion to the second endpoint device;
            retrieve historical data related to the data, wherein the historical data comprises usage information associated with the data; and
            based on the historical data, dynamically adjust a level of redundancy associated with the data, wherein adjusting a level of redundancy comprises:
                detecting that the data has a high utilization rate;
                detecting that the first endpoint device and second endpoint device are experiencing high latency;
                based on detecting that the first endpoint device and second endpoint device are experiencing high latency, determining that a latency associated with the data has increased above a latency threshold;
                detecting that a third endpoint device has a faster network connection than the first endpoint device and the second endpoint device;
                generating a copy of the first data portion and the second data portion; and
                transferring the copy of the first data portion and the copy of the second data portion to the third endpoint device.

2. The system according to claim 1, wherein the executable code further causes the processor to:
    receive a request to retrieve the data from the cloud data repository;
    search the data reference index to identify the data identifier associated with the data;
    determine that the first device ID and the second device ID are associated with the data identifier;
    determine, via the first device ID and the second device ID, that the data is stored on the first endpoint device and the second endpoint device;
    retrieve, over the network, the first data portion and the second data portion from the first endpoint device;
    decrypt the first data portion and the second data portion;
    regenerate the data, wherein the data comprises the first data portion and the second data portion; and
    transfer, over the network, the data to a computing system.

3. The system according to claim 1, wherein the executable code further causes the processor to:
    attempt to establish a secure communication channel with the first endpoint device;
    detect that the first endpoint device is offline;
    based on detecting that the first endpoint device is offline, determine that data uptime has dropped below a required uptime threshold;
    generate a copy of the first data portion and the second data portion; and
    transfer, over the network, the first data portion and the second data portion to a fourth endpoint device.

4. The system according to claim 1, wherein the data is subject to a data restriction, wherein the executable code further causes the processor to:
    determine that the first endpoint device has violated the data restriction; and
    delete, via an automatic wipe function, the first data portion and the second data portion from the first endpoint device.

5. The system according to claim 1, wherein the data is subject to a data restriction, wherein the executable code further causes the processor to deploy a data management application on the first endpoint device, wherein the data management application, when executed by a processor of the first endpoint device, causes the processor of the first endpoint device to:
    determine that the first endpoint device has violated the data restriction; and delete, via an automatic wipe function, the first data portion and the second data portion from the first endpoint device.

6. The system according to claim 5, wherein the data restriction is a territorial restriction which restricts a location of the first endpoint device to a predetermined territory, wherein determining that the first endpoint device has violated the data restriction comprises:
continuously monitoring the location of the first endpoint device; and
detecting that the first endpoint device is located outside of the predetermined territory.

7. The system according to claim 1, wherein dynamically adjusting the level of redundancy associated with the data further comprises:
detecting that the data has a low utilization rate; and
based on detecting that data has low utilization rate, decrease the level of redundancy by automatically deleting the first data portion and the second data portion from the third endpoint device.

8. The system according to claim 1, wherein the first endpoint device is in operative communication with the network via a wireless connection, wherein the second endpoint device is in operative communication with the network via a wired connection, and wherein each of the first endpoint device and second point device is a user computing device.

9. A computer program product for generating a distributed cloud data repository across a plurality of endpoint devices, the computer program product comprising at least one non-transitory computer readable medium having computer-readable program code portions embodied therein, the computer-readable program code portions comprising:
an executable portion for receiving a request to store a data on the cloud data repository;
an executable portion for assigning a data identifier to the data within a data reference index;
an executable portion for selecting a first endpoint device and a second endpoint device for storing the data, wherein the first endpoint device is assigned a first device ID within a device index, and the second endpoint device is assigned a second device ID within the device index;
an executable portion for associating the data identifier with the first device ID and the second device ID;
an executable portion for dividing the data into a plurality of data portions, the plurality of data portions comprising a first data portion and a second data portion;
an executable portion for encrypting the plurality of data portions via a data packing system;
an executable portion for transferring, over a network, the first data portion and the second data portion to the first endpoint device;
an executable portion for transferring, over the network, the first data portion and the second data portion to the second endpoint device;
an executable portion for retrieving historical data related to the data, wherein the historical data comprises usage information associated with the data;
an executable portion for, based on the historical data, dynamically adjusting a level of redundancy associated with the data, wherein adjusting a level of redundancy comprises:
detecting that the data has a high utilization rate;
detecting that the first endpoint device and second endpoint device are experiencing high latency;
based on detecting that the first endpoint device and second endpoint device are experiencing high latency, determining that a latency associated with the data has increased above a latency threshold;
detecting that a third endpoint device has a faster network connection than the first endpoint device and the second endpoint device;
generating a copy of the first data portion and the second data portion; and
transferring the copy of the first data portion and the copy of the second data portion to the third endpoint device.

10. The computer program product according to claim 9, the computer-readable program code portions further comprising:
an executable portion for receiving a request to retrieve the data from the cloud data repository;
an executable portion for searching the data reference index to identify the data identifier associated with the data;
an executable portion for determining that the first device ID and the second device ID are associated with the data identifier;
an executable portion for determining, via the first device ID and the second device ID, that the data is stored on the first endpoint device and the second endpoint device;
an executable portion for retrieving, over the network, the first data portion and the second data portion from the first endpoint device;
an executable portion for decrypting the first data portion and the second data portion;
an executable portion for regenerating the data, wherein the data comprises the first data portion and the second data portion; and
an executable portion for transferring, over the network, the data to a computing system.

11. The computer program product according to claim 9, the computer-readable program code portions further comprising:
an executable portion for retrieving device attribute data associated with the first endpoint device and the second endpoint device from the device index;
an executable portion for, based on the device attribute data, determining a processing power and a bandwidth capability of the first endpoint device and the second endpoint device; and
an executable portion for determining that the processing power and the bandwidth capability of the first endpoint device and the second endpoint device are sufficient to host the data,
wherein the first endpoint device and second endpoint device are selected based on determining that the processing power and the bandwidth capability of the first endpoint device and the second endpoint device are sufficient to host the data.

12. The computer program product according to claim 9, wherein the data is subject to a data restriction, wherein the computer-readable program code portions further comprise:
an executable portion for determining that the first endpoint device has violated the data restriction; and
an executable portion for deleting, via an automatic wipe function, the first data portion and the second data portion from the first endpoint device.

13. The computer program product according to claim 12, wherein the data restriction is a territorial restriction which restricts a location of the first endpoint device to a predetermined territory, wherein determining that the first endpoint device has violated the data restriction comprises:
- continuously monitoring the location of the first endpoint device; and
- detecting that the first endpoint device is located outside of the predetermined territory.

14. A computer-implemented method for generating a distributed cloud data repository across a plurality of endpoint devices, said method comprising:
- receiving a request to store a data on the cloud data repository;
- assigning a data identifier to the data within a data reference index;
- selecting a first endpoint device and a second endpoint device for storing the data, wherein the first endpoint device is assigned a first device ID within a device index, and the second endpoint device is assigned a second device ID within the device index;
- associating the data identifier with the first device ID and the second device ID;
- dividing the data into a plurality of data portions, the plurality of data portions comprising a first data portion and a second data portion;
- encrypting the plurality of data portions via a data packing system;
- transferring, over a network, the first data portion and the second data portion to the first endpoint device;
- transferring, over the network, the first data portion and the second data portion to the second endpoint device;
- retrieving historical data related to the data, wherein the historical data comprises usage information associated with the data;
- based on the historical data, dynamically adjusting a level of redundancy associated with the data, wherein adjusting a level of redundancy comprises:
  - detecting that the data has a high utilization rate;
  - detecting that the first endpoint device and second endpoint device are experiencing high latency;
  - based on detecting that the first endpoint device and second endpoint device are experiencing high latency, determining that a latency associated with the data has increased above a latency threshold;
  - detecting that a third endpoint device has a faster network connection than the first endpoint device and the second endpoint device;
  - generating a copy of the first data portion and the second data portion; and
  - transferring the copy of the first data portion and the copy of the second data portion to the third endpoint device.

15. The computer-implemented method according to claim 14, the method further comprising:
- receiving a request to retrieve the data from the cloud data repository;
- searching the data reference index to identify the data identifier associated with the data;
- determining that the first device ID and the second device ID are associated with the data identifier;
- determining, via the first device ID and the second device ID, that the data is stored on the first endpoint device and the second endpoint device;
- retrieving, over the network, the first data portion and the second data portion from the first endpoint device;
- decrypting the first data portion and the second data portion;
- regenerating the data, wherein the data comprises the first data portion and the second data portion; and
- transferring, over the network, the data to a computing system.

16. The computer-implemented method according to claim 14, the method further comprising:
- retrieving device attribute data associated with the first endpoint device and the second endpoint device from the device index;
- based on the device attribute data, determining a processing power and a bandwidth capability of the first endpoint device and the second endpoint device; and
- determining that the processing power and the bandwidth capability of the first endpoint device and the second endpoint device are sufficient to host the data,
- wherein the first endpoint device and second endpoint device are selected based on determining that the processing power and the bandwidth capability of the first endpoint device and the second endpoint device are sufficient to host the data.

17. The computer-implemented method according to claim 14, wherein the data is subject to a data restriction, wherein the method further comprises:
- determining that the first endpoint device has violated the data restriction; and
- deleting, via an automatic wipe function, the first data portion and the second data portion from the first endpoint device.

18. The computer-implemented method according to claim 17, wherein the data restriction is a territorial restriction which restricts a location of the first endpoint device to a predetermined territory, wherein determining that the first endpoint device has violated the data restriction comprises:
- continuously monitoring the location of the first endpoint device; and
- detecting that the first endpoint device is located outside of the predetermined territory.

* * * * *